United States Patent [19]

Cabeza

[11] Patent Number: 4,593,924
[45] Date of Patent: * Jun. 10, 1986

[54] HEADSET FOR BICYCLES

[76] Inventor: Maximino R. Cabeza, Nevada St. 306, Ric Piedras, P.R. 00926

[*] Notice: The portion of the term of this patent subsequent to Jul. 27, 1999 has been disclaimed.

[21] Appl. No.: 514,018

[22] Filed: Jul. 15, 1983

[51] Int. Cl.$^4$ .............................................. B62K 21/18
[52] U.S. Cl. .................................................. 280/279
[58] Field of Search ...................... 280/279, 280, 274; 403/20, 370, 371, 374, 377

[56] References Cited

U.S. PATENT DOCUMENTS

| 3,306,684 | 2/1967 | Klein, Jr. | 280/279 |
| 4,341,394 | 7/1982 | Cabeza | 280/279 |
| 4,436,468 | 3/1984 | Ozaki | 280/279 |

FOREIGN PATENT DOCUMENTS 203535 9/1923 United Kingdom ............... 280/279

Primary Examiner—John J. Love
Assistant Examiner—Donn McGiehan
Attorney, Agent, or Firm—Scrivener Clarke Scrivener and Johnson

[57] ABSTRACT

In the headset of a bicycle in which a clamping ring connected to the fork stem is compressed by a locknut into engagement with the handlebar stem, to thereby connect the handlebar stem to the fork stem, means are provided for locking the clamping ring to the fork stem to prevent undesired movement of the handlebars with respect to the fork stem.

4 Claims, 14 Drawing Figures

U.S. Patent  Jun. 10, 1986  Sheet 1 of 2  4,593,924
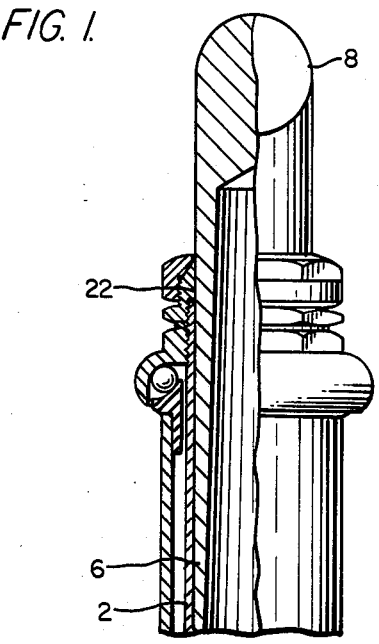
FIG. 1.
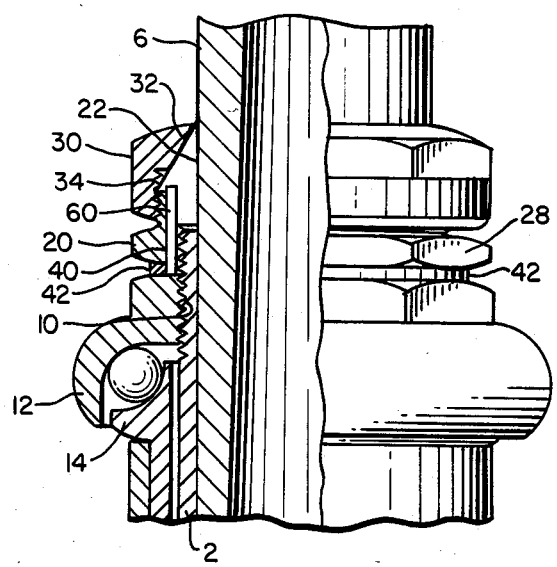
FIG. 2.
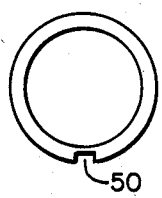
FIG. 3.
FIG. 5.
FIG. 7.
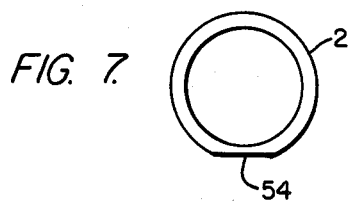
FIG. 4.  FIG. 5A.  FIG. 6.  FIG. 7A.
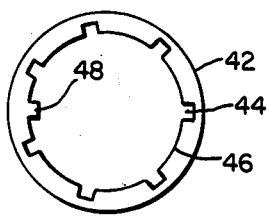
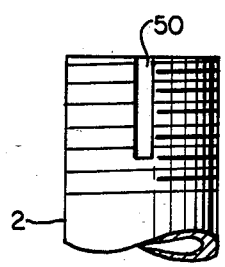
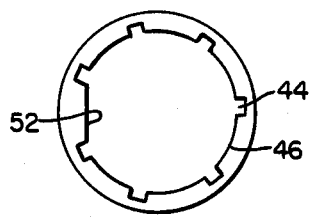

HEADSET FOR BICYCLES

SUMMARY OF THE INVENTION

A headset for bicycles includes a clamping ring having a lower internal part threaded to the steering fork stem and an upper internal part surrounding the handlebar stem, and a lock nut surrounds the external upper part of the clamping ring and is operable to force it into engagement with the handlebar stem to lock the steering fork stem to the handlebar stem. The invention provides means for preventing undesired relative rotational movement between the clamping ring and the fork stem.

FIELD OF THE INVENTION

In FIG. 1 of the drawings there is shown parts of the improved headset for bicycles which is described and claimed in my U.S. Pat. No. 4,341,394, issued July 27, 1982 for Simultaneous Connection Between Handlebar and Steering Fork of Bicycle. The same parts are shown in FIG. 2 but in that figure are modified in accordance with the present invention. The headset incorporating the present invention comprises a hollow cylindrical stem 2 which extends upwardly from the steering fork of the front wheels of a bicycle and within which is the cylindrical stem 6 which extends downwardly from the bicycle handlebars 8. At its upper end the fork stem 2 is provided with an external screw thread 10 by which it is connected to the upper member 12 of an annular ball bearing race, the lower rotatable member of which is shown at 14. Above the upper ball race member 12 there is an annular clamping ring 20 which has at and adjacent its upper part a cylindrical internal smooth surface 22 which closely surrounds the outer surface of the cylindrical handlebar stem 6. Below this surface the ring is internally provided with a thread 24 by which it is screw threaded to the external thread 10 on the upper end of the steering fork stem 2. The upper part of the outer surface of the clamping ring is formed into a frusto-conical surface 26, and below that surface there is an external threaded surface 27 and below that surface there is a radially enlarged part 28 having multiple external surfaces for engagement by a wrench for turning the clamping ring.

An annular locknut 30 is positioned above the clamping ring in surrounding relation to the handlebar stem 6, and at its upper part is provided with an internal frusto-conical surface 32 which is adapted to lie in surface-to-surface engagement with the external frusto-conical surface 26 of the clamping ring. Below the surface 32 the locknut is provided with an internal thread 34 by which it is threaded to the external screw thread 27 on the clamping ring.

In the assembled relation of the parts the clamping ring 20 is attached by internal screw threads 24 to the steering fork stem 2 and the locknut 30 is attached to the clamping ring by screw threads with the frusto-conical surfaces 32, 26 of the locknut and clamping ring, respectively, in engagement.

In order to attach the handlebar stem to the fork stem the locknut 30 is screwed down on the clamping ring 20, causing their frusto-conical surfaces to be forced together thereby contracting the upper, slotted part of the clamping ring against the handlebar stem.

BACKGROUND OF THE INVENTION

In the operation of a bicycle the handlebar is often subjected to a blow from an external source, resulting in a twisting of the handlebar stem 6 with respect to the fork stem 2 with consequent mis-alignment of the handlebars with respect to the longitudinal axis and direction of movement of the bicycle, which may result in adverse effect on its safe operation. It is therefore the object of the invention to provide means for insuring that the clamping ring 20 will not move relatively to the steering fork stem 2 when the handlebars are subjected to such an undesired twisting force.

BRIEF DESCRIPTION OF THE DRAWINGS

FIG. 1 is a part elevational and part section view of the headset of a bicycle according to my invention as disclosed in my patent referred to above;

FIG. 2 is an enlarged part elevational and part sectional view of the preferred assembly of parts for locking together the clamping ring and steering fork of the headset;

FIG. 3 is a part elevational and part sectional view of the clamping ring, washer and pin of the first embodiment of the invention, in partly assembled positions;

FIG. 4 is a plan view of the washer modified in accordance with the invention;

FIGS. 5 and 5A are upper end and side elevational view of the steering fork stem;

FIGS. 6, 7 and 7A correspond to FIGS. 4, 5 and 5A and show other means for connecting the clamping ring to the steering fork;

DESCRIPTION OF THE PREFERRED EMBODIMENT OF THE INVENTION

Figure 8:
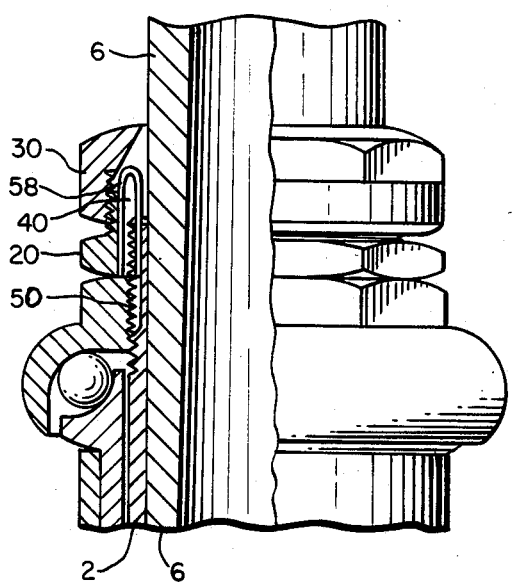
FIG. 8 is a part elevational and part sectional view showing a further form of the invention.

The preferred embodiment of the invention is disclosed in FIGS. 2 to 5A of the drawings, in which there are illustrated parts for connecting the clamping ring 20 to the fork stem 2. Such means comprise, first, the clamping ring 20 itself which, as shown in FIG. 3, is provided with an axially extending slot 40 which extends from the upper conical surface 26 to the lower surface of the clamping ring and intersects the internal threaded surface 24. An annular washer 42 is positioned below the lower surface of the clamping ring and has a plurality of spaced recesses 44 in its inner edge 46 and, in addition, has a lug 48 which extends inwardly from its inner edge. The upper end of the fork stem 2, as shown in FIGS. 5 and 5A, is provided with an axially extending slot 50 which is of the same width and depth as the lug 48 of the washer 42. The washer is positioned between the lower surface of the clamping ring and the upper surface of the upper part of the ball race 12, with the inwardly projecting lug 48 of the washer within the slot 50 of the fork stem, after which the clamping ring is turned down onto the washer and is adjusted to align one of the slots 40 in the clamping ring with one of the slots 44 of the washer, and a pin 60 is pushed axially into the aligned clamping ring slot 40 and washer slot 44. The assembled position of the parts is shown in FIG. 2, and it will be apparent that as the washer 42 is locked to the fork item 2 by lug 48, and the clamping ring is locked to the washer by pin 60, the clamping ring 20, as a result, is locked to the fork stem 2.

In FIGS. 6, 7 and 7A there is disclosed a modification of the locking means disclosed in FIGS. 1 and 5A, in which a flat surface 52 which forms a chord of the inner annular edge of the washer is substituted for the inwardly projecting lug 48 of the washer, and a flat surface 54 on the outer surface of the upper end of the steering fork stem 2 is substituted for the axial slot 50.

Figure 9:
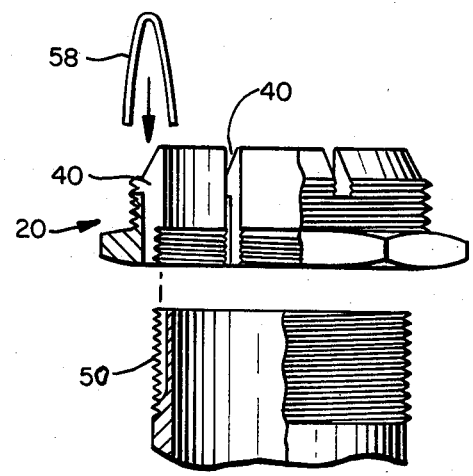
FIG. 9 is an exploded view of the parts shown assembled in FIG. 8.
Figure 10:
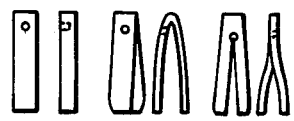
FIG. 10 illustrates forms which may be taken by the pin 58 of FIGS. 8 and 9.

Another form which the invention may take is disclosed in FIGS. 8 and 9, in which there are illustrated the fork stem 2, handlebar stem 6, clamping ring 20 and locknut 30, all in the normal position and arrangement disclosed in FIG. 1. The means for locking together the clamping ring and the fork stem comprise a plurality of spaced, axial slots 40 formed in the inner surface of the clamping ring, a spaced axial slot 50 formed in the outer surface of the fork stem, one pin 58 which is of such length and transverse dimemsions that it may be received within slots in the clamping ring and the fork stem when they are radially aligned, thereby locking these two parts together The pin 58 may be shaped in any of the ways illustrated in FIG. 10.

Figure 11:
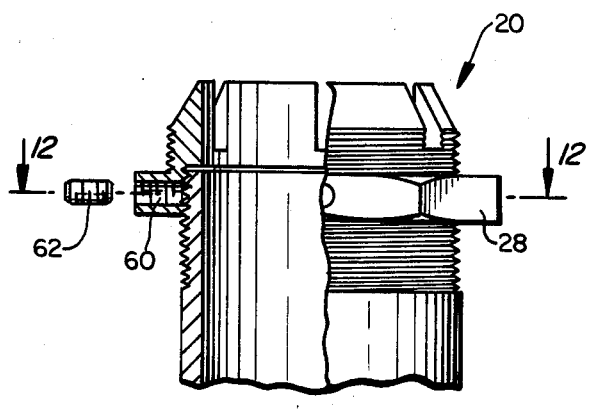
FIG. 11 is a part elevational and part sectional view showing a further form of the invention.
Figure 12:
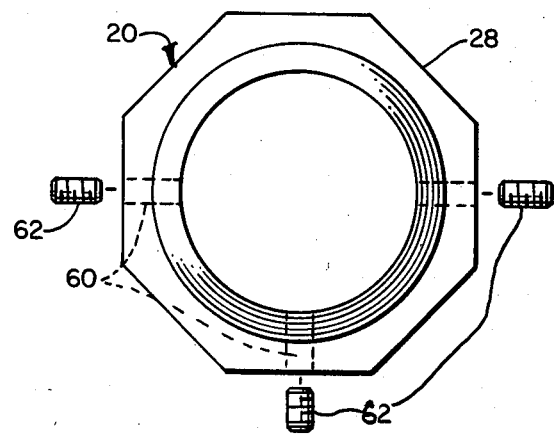
FIG. 12 is a cross sectional view taken on line 12—12 of FIG. 11.

In a further embodiment of the invention, which is disclosed in FIGS. 11 and 12 one or more of the flat tool engaging surfaces 28 at the lower part of the clamping ring 20 is provided with a screw threaded passage 60 opening interiorly and exteriorly of the clamping ring, and a set screw 62 is provided to be screw threaded into each of these openings and tightened when in place with its inner end engaging the fork stem, thereby connecting the clamping ring to the fork stem.

I claim:

1. A headset for a bicycle, comprising
   (a) the upwardly extending hollow cylindrical stem of the steering fork of the front wheels of a bicycle,
   (b) the downwardly extending cylindrical handlebar stem positioned within the fork stem telescopically,
   (c) a contractile clamping ring surrounding and connected by threads to the upper end of the fork stem and having at its upper part an un-threaded internal surface surrounding the adjacent part of the handlebar stem and a frusto-conical external surface,
   (d) a locknut loosely surrounding the handlebar stem and connected by threads to the clamping ring, and having a frusto-conical internal surface engaging the frusto-conical external surface of the clamping ring whereby screw threaded movement of the nut toward the ring contracts the ring to cause engagement of the un-threaded internal surface of the clamping ring with the handlebar stem, and
   (e) means for releasably connecting the clamping ring to the fork stem to prevent loosening of the connection between these parts.

2. The combination according to claim 1, in which the means for connecting the clamping ring to the fork stem comprises:
   (a) a slot extending axially through the interior part of the clamping ring at a position outside the outer periphery of the fork stem,
   (b) an axially extending slot formed in the outer wall of the fork stem,
   (c) a washer beneath and adjacent the lower surface of the clamping ring and having an inwardly projecting lug positioned within the slot in the fork stem and having a plurality of spaced slots in its inner edge, and
   (d) a pin adapted extending through and into the slot in the clamping ring and one of the axially aligned slots in the inner edge of the washer.

3. The combination according to claim 1, in which the means for connecting the clamping ring to the fork stem comprises:
   (a) a slot extending axially through the interior part of the clamping ring at a position outside the outer periphery of the fork stem,
   (b) a flat surface formed on the outer wall of the fork stem,
   (c) a washer beneath and adjacent the lower surface of the clamping ring and having a flat surface formed on its inner edge engaging the flat surface on the fork stem to prevent relative movement between the washer and the fork stem, and
   (d) a pin extending through and into the slot in the clamping ring and an axially aligned slot in the inner edge of the washer.

4. The combination according to claim 1, in which the means for connecting the clamping means to the fork stem comprises:
   (a) a plurality of slots extending axially entirely through the inner wall of the clamping ring,
   (b) an axially extending slot formed in the upper end in the outer wall of the fork stem, and
   (c) a pin positioned within the slots in the clamping ring and the fork stem.

* * * * *